United States Patent
Inoue et al.

(10) Patent No.: US 8,107,350 B2
(45) Date of Patent: Jan. 31, 2012

(54) OPTICAL INFORMATION RECORDING/REPRODUCING APPARATUS AND OBJECTIVE LENS FOR THE SAME

(75) Inventors: Satoshi Inoue, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/972,790

(22) Filed: Dec. 20, 2010

(65) Prior Publication Data
US 2011/0149712 A1 Jun. 23, 2011

(30) Foreign Application Priority Data

Dec. 21, 2009 (JP) ................................. 2009-289228
Aug. 9, 2010 (JP) ................................. 2010-178722

(51) Int. Cl.
*G11B 7/00* (2006.01)
(52) U.S. Cl. ............................. 369/112.26; 369/112.07
(58) Field of Classification Search ............. 369/112.03, 369/112.05, 112.06, 112.07, 112.23, 112.25, 369/112.26
See application file for complete search history.

(56) References Cited

U.S. PATENT DOCUMENTS

| | | | |
|---|---|---|---|
| 5,446,565 A | | 8/1995 | Komma et al. |
| 2003/0053223 A1* | | 3/2003 | Takeuchi et al. ............... 359/742 |
| 2004/0156301 A1* | | 8/2004 | Ikenaka .................... 369/112.17 |
| 2004/0160885 A1 | | 8/2004 | Kimura |
| 2004/0213131 A1 | | 10/2004 | Kimura et al. |
| 2004/0246873 A1* | | 12/2004 | Maruyama et al. ....... 369/112.03 |
| 2004/0264348 A1* | | 12/2004 | Mimori .................... 369/112.05 |
| 2005/0002118 A1* | | 1/2005 | Maruyama et al. ........... 359/719 |
| 2005/0036430 A1* | | 2/2005 | Ikenaka .................... 369/112.05 |
| 2005/0094536 A1* | | 5/2005 | Kimura .................... 369/112.05 |

FOREIGN PATENT DOCUMENTS

| | | |
|---|---|---|
| JP | 7-98431 | 4/1995 |
| JP | 2004-265573 | 9/2004 |
| JP | 2004-326862 | 11/2004 |

OTHER PUBLICATIONS

U.S. Appl. No. 12/949,023 to Daisuke Koreeda et al., which was filed on Nov. 18, 2010.

* cited by examiner

*Primary Examiner* — Latanya Bibbins
(74) *Attorney, Agent, or Firm* — Greenblum & Bernstein, P.L.C.

(57) ABSTRACT

An objective lens including: a first region to respectively converge first and second light beams onto recording surfaces of first and second optical discs; and a second region located outside of the first region and configured to converge the first light beam onto the recording surface of the first optical disc and not to converge the second light beam onto the recording surface of each of the first and second optical discs, and wherein the first region is divided into a plurality of refractive surface zones concentrically formed about an optical axis and has a first step, a diffraction order at which a diffraction efficiency is maximized for each of the first and second light beams passing through the first step in the first region is a first order, and the objective lens satisfies a condition:

$$0.80 < ((S_{out} - S_d)/S_{out})^2/\eta_{in} < 1.45 \qquad (1).$$

18 Claims, 6 Drawing Sheets

FIG. 1
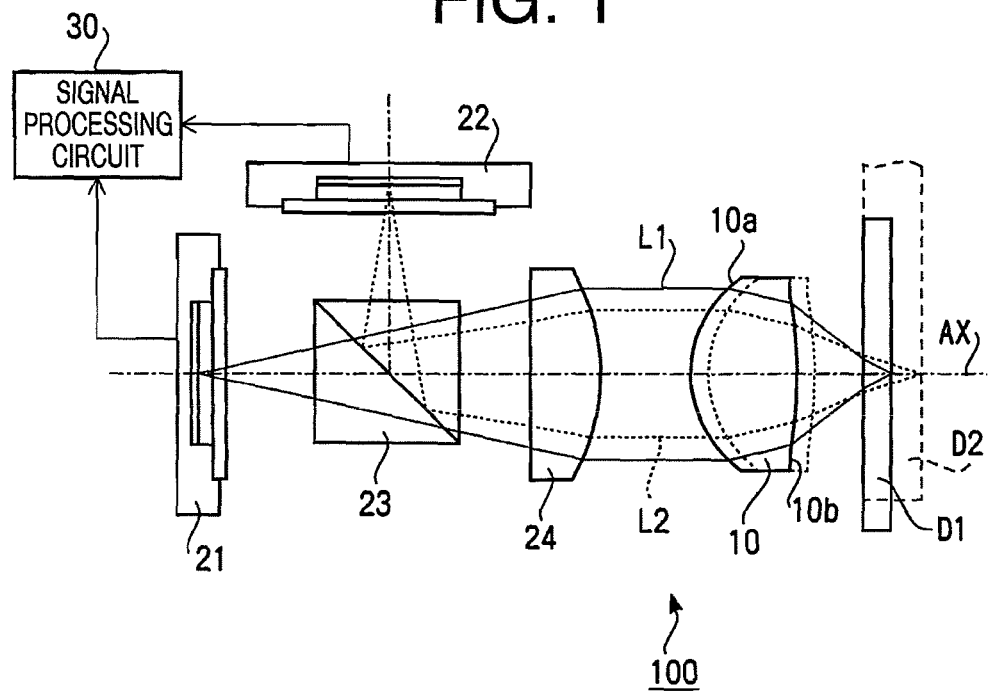
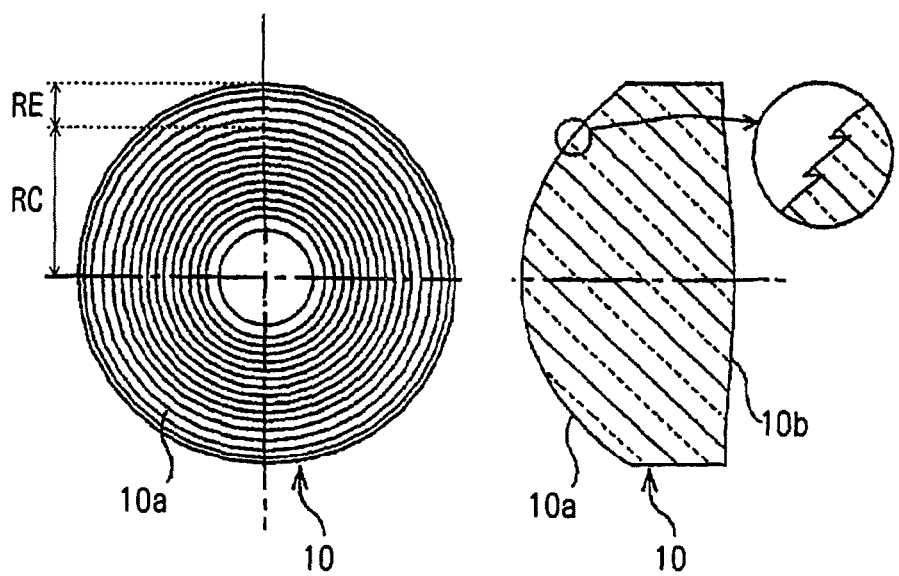
FIG.2A  FIG.2B

−0.003    0.003

——— 0.000   0.406
········ 0.003   0.411
─ ─ ─ −0.003   0.401

−0.003    0.003

——— 0.000   0.662
········ 0.002   0.667
─ ─ ─ −0.002   0.657

|   | | |
|---|---|---|
| ——— | 0.000 | 0.406 |
| ·········· | 0.003 | 0.411 |
| — — — | −0.003 | 0.401 |

|   | | |
|---|---|---|
| ——— | 0.000 | 0.662 |
| ·········· | 0.001 | 0.667 |
| — — — | −0.001 | 0.657 |

US 8,107,350 B2

OPTICAL INFORMATION RECORDING/REPRODUCING APPARATUS AND OBJECTIVE LENS FOR THE SAME

BACKGROUND OF THE INVENTION

The present invention relates to an objective lens for an optical information recording/reproducing apparatus adapted to record information to and/or reproduce information from two types of optical discs based on different standards, and to an optical information recording/reproducing apparatus on which such an objected lens is mounted.

There exist various standards of optical discs, such as DVD (Digital Versatile Disc) and BD (Blu-ray Disc), differing in recording density, protective layer thickness, etc. Therefore, an objective optical system mounted on the optical information recording/reproducing apparatus is required to have a compatibility with a plurality of types of optical discs. In this case, the term "compatibility" means to guarantee realizing information recording and information reproducing without the need for replacement of components even when the optical disc being used is changed. Incidentally, in this specification, the "optical information recording/reproducing apparatuses" include apparatuses for both information reproducing and information recording, apparatuses exclusively for information reproducing, and apparatuses exclusively for information recording.

In order to have the compatibility with the plurality of types of optical discs based on the different standards, it is necessary to correct the spherical aberration which changes depending on the difference in protective layer thickness (i.e., a distance between a recording surface and a surface of a protective layer on an optical disc) between the optical discs and to form a suitable beam spot in accordance with the difference in recording density between the optical discs by changing the numerical aperture NA of the objective optical system. In general, the size of the beam spot becomes smaller, as the wavelength of a laser becomes shorter. For this reason, the optical information recording/reproducing apparatus is configured to selectively use one of a plurality of types of laser beams having different wavelengths in accordance with the recording density of the optical disc being used. The optical information recording/reproducing apparatus uses, for example, light having the wavelength of approximately 660 nm (i.e., so-called red laser light) for information recording or information reproducing for DVD and light having the wavelength of approximately 405 nm (i.e., so-called blue laser light) for information recording or information reproducing for BD.

Each of Japanese Patent Provisional Publications No. 2004-265573A and No. 2004-326862A discloses an optical information recording/reproducing apparatus having the compatibility with BD and DVD. The optical information recording/reproducing apparatus is provided with an objective lens configured to have a diffraction structure having a plurality of annular zones concentrically formed about an optical axis. The diffraction structure has a first region which contributes to convergence of blue laser light on a recording surface of BD and convergence of red laser light on a recording surface of DVD, and has a second region which contributes to only convergence of the blue laser light on the recording surface of BD. In order to increase the diffraction efficiency for each of the laser beams based on the different standards, the optical information recording/reproducing apparatus is configured to use different high-orders of diffracted light respectively for the laser beams based on the different standards. However, the diffraction structure disclosed in the above described publications has a drawback that since the height of each step is high, processing and molding for a lens is difficult.

To solve the above described drawback, it is necessary to set the diffraction order (at which the diffraction efficiency is maximized) to a low order for each of the laser beams based on the different standards. However, when the diffraction order is set to a low order, the diffraction efficiency inevitably decreases when one of the laser beams based on the different standards is used. For this reason, the inventors of the present invention focused attention to the fact that the diffraction structure should be designed to use the same low diffraction orders of light for the laser beams based on the different standards.

However, if the first region is designed to use the same low diffraction orders of light for the laser beams based on the different standards, the diffraction efficiency of the blue laser beam in the first region becomes smaller than that in the second region. Since the transmission light amount of the blue laser beam shows nonuniformity between the pupil center and the periphery of the pupil, the blue laser beam is affected by super-resolution. The term "super-resolution" means a phenomenon where the beam spot size is reduced when the transmission light amount in the peripheral of the pupil is larger than the transmission light amount in the pupil center. Therefore, when super-resolution is caused, the beam spot size formed on the recording surface of the optical disc is considerably reduced relative to an expected beam spot size. In this case, since the beam spot size is too small with respect to a pit on the recording surface, the information recording or information reproducing may not be executed properly.

An optical information recording/reproducing apparatus disclosed in Japanese Patent Provisional Publication No. HEI 7-98431A (hereafter, referred to as JP HEI 7-98431A) is configured to solve a problem that the transmission light amount has nonuniformity between the pupil center and the periphery of the pupil, by utilizing a property that the light amount of a laser beam becomes lower at a point closer to the periphery of the laser light. Specifically, in JP HEI 7-98431A, a designer of the optical information recording/reproducing apparatus tries to reduce the amount of light entering the peripheral region of the objective optical system, by setting the acceptance angle of a collimator lens to a wide value and thereby setting the transmission light amount in the central region to be close to the transmission light amount in the peripheral region. However, in this case, the design restrictions regarding the focal length of the collimator lens becomes severe, and thereby it becomes difficult to freely set the magnification of the objective optical system.

SUMMARY OF THE INVENTION

The present invention is advantageous in that it provides an objective lens for an optical information recording/reproducing apparatus adapted to record information to and/or reproduce information from two types of optical discs, such as BD and DVD, and to provide an optical information recording/reproducing apparatus on which such an objective lens is mounted.

According to an aspect of the invention, there is provided an objective lens for an optical information recording/reproducing apparatus configured to record information to and/or reproduce information from two types of optical discs including a first optical disc and a second optical disc differing in recording density, by selectively using substantially collimated light beams having first and second wavelengths. When $\lambda 1$ (unit: nm) represents the first wavelength and $\lambda 2$ (unit: nm) represents the second wavelength, λ1 and λ2 satisfy following relationships: 380<λ1<420; and 640<λ2<700. When t1 (unit: mm) represents a protective layer thickness of the first optical disc for which information recording or information reproducing is executed by using the light beam having the wavelength λ1, and t2 (unit: mm) represents a protective layer thickness of the second optical disc for which information recording or information reproducing is executed by using the light beam having the wavelength λ2, t1 and t2 satisfy following relationships: 0.05<t1<0.15; and 0.50<t2<0.70. When NA1 represents a numerical aperture required for the information recording or information reproducing for the first optical disc, and NA2 represents a numerical aperture required for the information recording or information reproducing for the second optical disc, NA1 and NA2 satisfy a following relationship: NA1>NA2.

In this configuration, the objective lens includes, on at least one of surfaces of the objective lens: a first region configured to converge the light beam having the first wavelength onto a recording surface of the first optical disc and to converge the light beam having the second wavelength onto a recording surface of the second optical disc; and a second region that is located outside of the first region and is configured to converge the light beam having the first wavelength onto the recording surface of the first optical disc and not to converge the light beam having the second wavelength onto the recording surface of each of the first and second optical discs. The first region is divided into a plurality of refractive surface zones concentrically formed about an optical axis of the objective lens, and has a first step which is formed between adjacent ones of the plurality of refractive surface zones and gives an optical path length difference to an incident light beam. A diffraction order at which a diffraction efficiency is maximized for each of the light beams having the first and second wavelengths passing through the first step in the first region is a first order. The second region is divided into a plurality of refractive surface zones concentrically formed about the optical axis of the objective lens, and has a second step which is formed between adjacent ones of the plurality of refractive surface zones and gives an optical path length difference to an incident light beam. When ηin represents a diffraction efficiency in the first region, Sout represents a projected area of the second region on a plane which is orthogonal to the optical axis, and Sd represents a projected area of rounded corners each of which is formed at each step portion in the second region and has a width equal to an each step's height defined in a direction of the optical axis, the objective lens satisfies a condition:

$$0.80 < ((Sout-Sd)/Sout)^2/\eta in < 1.45 \quad (1).$$

With this configuration, it becomes possible to provide an objective lens for an optical information recording/reproducing apparatus adapted to suitably record information to and/or reproduce information from a plurality of types of optical discs based on different standards, and to provided an information recording/reproducing apparatus on which the objective lens is mounded.

By satisfying the condition (1), i.e., by appropriately controlling the blazed wavelength in the first region in accordance with the number of steps in the second region (in other words, by setting the diffraction efficiency in the first region to be close to the transmissivity of the second region defined by considering loss of light amount caused by the annular zones in the second region), it becomes possible to achieve a balance between the transmission light amount in the first region and the transmission light amount in the second region, and thereby to form a suitable beam spot on the recording surface of the first optical disc. The loss of light amount by the annular zones means a phenomenon where the annular zones is brought to a state of not contributing to convergence of the light beam due to rounded corners caused by an inappropriate accuracy in processing of a metal mold or an inappropriate transferring property in a molding process. When the intermediate term of the condition (1) gets larger than the upper limit of the condition (1), the transmission light amount in the second region becomes excessively large relative to the transmission light amount in the first region. In this case, it becomes impossible to avoid the effect by the super-resolution, and thereby the size of a beam spot on a recording surface of the first optical disc is reduced excessively. When the intermediate term of the condition (1) gets smaller than the lower limit of the condition (1), the transmission light amount in the second region becomes extremely small. That is, since the second region serves as an aperture stop for the light beam having the wavelength λ1, the numerical aperture NA is changed, and thereby it becomes impossible to form a suitable beam spot on the recording surface of the first optical disc.

Is should be noted that the diffraction efficiency rein is defined as follows.

$$\eta in = \sin c^2(\alpha-1)$$

$$\alpha = \lambda B1 [n(\lambda 1)-1]/\{\lambda 1 [n(\lambda B1)-1]\}$$

λB1: blazed wavelength in the first region (unit: nm)
n(λ1): refractive index at wavelength λ1
n(λB1): refractive index at wavelength λB1

The condition (1) may be rewritten to the following condition (2). Therefore, according to another aspect of the invention, there is provided an objective lens which satisfies, in place of the condition (1), a condition:

$$0.80 < \eta out/\eta in < 1.45 \quad (2)$$

where ηin represents a diffraction efficiency in the first region, and ηout represents a light use efficiency of the second region including rounded corners.

That is, ηout is a numeric value defined by considering the diffraction efficiency and loss of light amount by rounded corners, and represents a ratio of transmissivity defined when the second region includes a step structure with respect to transmissivity defined when the second region does not have the step structure.

By satisfying the condition (2) (i.e., by appropriately controlling the blazed wavelength in the first region in accordance with the light use efficiency in the second region), it becomes possible to achieve a balance between the transmission light amount in the first region and the transmission light amount in the second region, and thereby to form a suitable beam spot on the recording surface of the first optical disc. When the intermediate term of the condition (2) gets larger than the upper limit of the condition (2), the transmission light amount in the second region becomes excessively large relative to the transmission light amount in the first region. Therefore, in this case, it is impossible to avoid the effect of the super-resolution, and thereby the size of the beam spot on the recording surface of the first optical disc is reduced excessively. When the intermediate term of the condition (2) gets lower than the lower limit of the condition (2), the transmission light amount in the second region becomes extremely small. That is, since the second region serves as an aperture stop for the light beam having the wavelength λ1, the numerical aperture NA is changed, and thereby it becomes impossible to form a suitable beam spot on the recording surface of the first optical disc.

In at least one aspect, when λB1 (unit: nm) represents a blazed wavelength in the first region, λB1 may satisfy a condition:

$$450 \leq \lambda B1 \leq 530 \quad (3).$$

By satisfying the condition (3), a more suitable balance can be achieved between the transmission light amount in the first region and the transmission light amount in the second region, and therefore the effect on the spot shape by the super-resolution can be further suppressed. When the intermediate term of the condition (3) gets smaller than the lower limit of the condition (3), the diffraction efficiency of the light beam having the wavelength 2.2 in the first region decreases, and therefore the information recording or information reproducing cannot be appropriately performed for the second optical disc. When the intermediate term of the condition (3) gets larger than the upper limit of the condition (3), the transmission light amount in the first region becomes too small, and there is a possibility that the spot shape is deteriorated by the effect of the super-resolution. If the transmission light amount in the second region is reduced to suppress the above described deterioration of the spot shape, another problem arises. That is, in this case, the information recording or information reproducing for the first optical disc cannot be properly performed due to shortage of the light amount.

In at least one aspect, when λB2 (unit: nm) represents a blazed wavelength in the second region, λB2 may satisfy a condition:

$$390 \leq \lambda B2 \leq 420 \quad (4).$$

By satisfying the condition (4), the diffraction efficiency of the light beam having the wavelength λ1 in the second region becomes approximately 100%. If the intermediate term of the condition (4) falls outside the range defined by the condition (4), the diffraction efficiency of the light beam having the wavelength λ1 in the second region decreases, which is undesirable.

In at least one aspect, when NA1' represents a numerical aperture for the light beam having the wavelength λ1, and NA2' represents a numerical aperture for the light beam having the wavelength λ2, the objective lens may satisfy following conditions:

$$0.78 < NA1' < 0.90 \quad (5); \text{ and}$$

$$0.58 < NA2' < 0.68 \quad (6).$$

With regard to the condition (1), the objective lens may satisfy a condition:

$$0.85 < ((Sout-Sd)/Sout)^2/\eta in < 1.15 \quad (7).$$

By satisfying the condition (7), it becomes possible to achieve a more suitable balance between the transmission light amount in the first region and the transmission light amount in the second region.

With regard to the condition (2), the objective lens may satisfy a condition:

$$0.85 < \eta out/\eta in < 1.15 \quad (8).$$

In at least one aspect, a total number of steps in the first region and the second region may be larger than or equal to 20.

In at least one aspect, a number of steps in the second region may be larger than or equal to 1.

In at least one aspect, a diffraction order at which a diffraction efficiency of the light beam having the wavelength λ1 is maximized in the second region may be a first order. Since the diffraction efficiency is optimized at the wavelength λ1, the diffraction order at which the diffraction efficiency of the light beam having the wavelength λ1 is maximized may set for a high-order, such as the second order, the third order, and the fifth order.

According to another aspect of the invention, there is provided an optical information recording/reproducing apparatus, which is provided with light sources emitting light beams having the first and second wavelength; one of the above described objective lenses; and a signal processing unit which detects a returning light beam from a recording surface of one of the first and second optical discs and executes a predetermined signal processing.

BRIEF DESCRIPTION OF THE ACCOMPANYING DRAWINGS

FIG. 1 illustrates a general configuration of an optical information recording/reproducing apparatus according to an embodiment.

FIGS. 2A and 2B generally illustrate a configuration of an objective lens according to the embodiment.

DETAILED DESCRIPTION OF THE EMBODIMENTS

Figure 3:
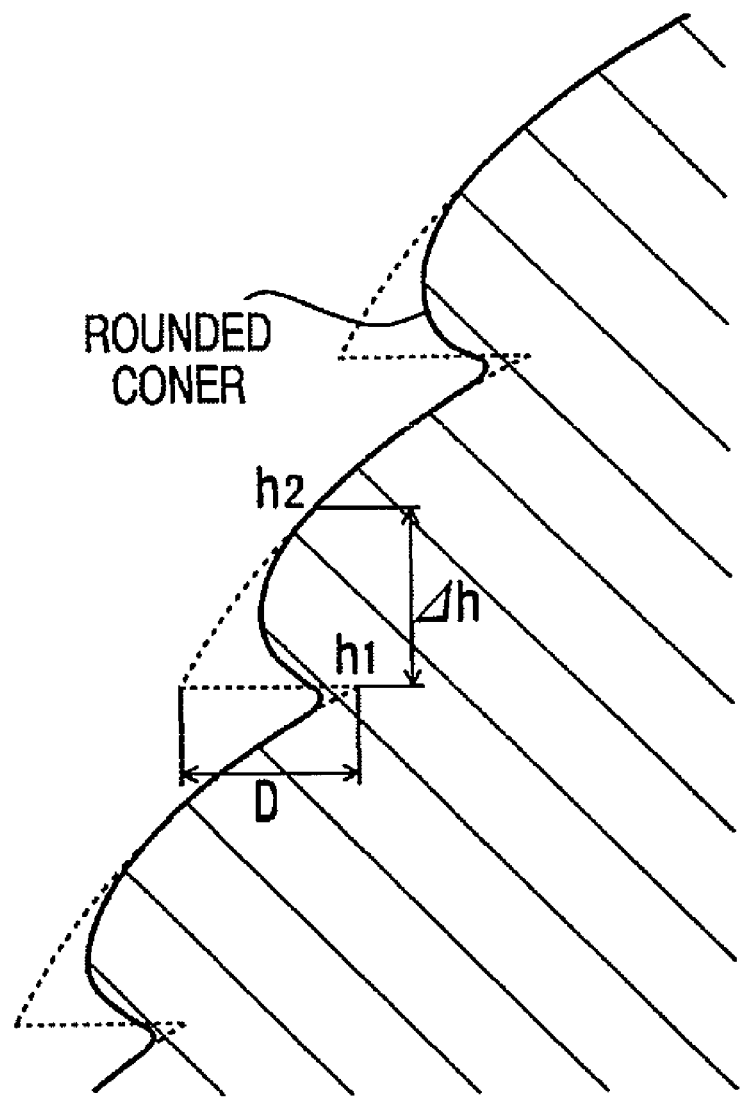
FIG. 3 is an explanatory illustration for explaining rounded corners caused at steps on a surface of the objective lens.

Hereinafter, an optical information recording/reproducing apparatus according to an embodiment of the invention is described. The optical information recording/reproducing apparatus is configured to have the compatibility with two types of optical discs differing in protective layer thickness, recording density and etc. In the following, of the two types of optical discs, a high-recording density optical disc (e.g. BD) is referred to as an optical disc D1, and an optical disc (e.g., DVD and DVD-R) having the recording density lower than that of BD is referred to as an optical disc D2.

When the protective layer thicknesses of the optical discs D1 and D2 are defined as t1 (unit: mm) and t2 (unit: mm) respectively, the following relationship holds.

$$t1 < t2$$

In view of individual differences of products, the protective layer thicknesses t1 and t2 fall within the ranges indicated below.

$$0.05 < t1 < 0.15$$

$$0.50 < t2 < 0.70$$

When information recording or information reproducing is performed for the optical discs D1 and D2, it is required to change the numerical aperture NA so that a suitable beam spot can be formed depending on the difference in recording density between the optical discs D1 and D2. When the optimal design numerical apertures required for information recording or information reproducing for the optical discs D1 and D2 are defined as NA1 and NA2, respectively, the following relationship holds.

$$NA1 > NA2$$

That is, when the optical disc D1 having a high recording density is used, it is required to form a beam spot smaller than that for the optical disc D2, and therefore a larger NA is required for the optical disc D1. For example, NA1 is 0.85 and NA2 is 0.60.

For information recording or information reproducing for the optical discs D1 and D2 differing in recording density, laser beams having different wavelengths are used in the optical information recording/reproducing apparatus so that suitable beam spots can be obtained respectively for the different recording densities of the optical discs D1 and D2. Specifically, when the optical disc D1 is used, a laser beam having a wavelength $\lambda 1$ (unit: nm) is emitted from a light source to form a relatively small beam spot on a recording surface of the optical disc D1. On the other hand, when the optical disc D2 is used, a laser beam having a wavelength $\lambda 2$ (unit: nm) is emitted from a light source so that a beam spot larger than that for the optical disc D1 can be formed on a recording surface of the optical disc D2. That is, regarding the wavelengths $\lambda 1$ and $\lambda 2$, the following relationship holds.

$$\lambda 1 < \lambda 2$$

In view of the difference in use environment and individual differences of products of light sources, $\lambda 1$ and $\lambda 2$ vary in the ranges indicated below.

$$380 < \lambda 1 < 420$$

$$640 < \lambda 2 < 700$$

FIG. 1 illustrates a general configuration of an optical information recording/reproducing apparatus 100 according to the embodiment of the invention. The optical information recording/reproducing apparatus 100 includes an objective lens 10, a BD module 21, a DVD module 22, a beam combiner 23 and a collimator lens 24. In FIG. 1, a chain line represents a reference axis AX of the optical information recording/reproducing apparatus 100. In a normal state, an optical axis of the objective lens 10 coincides with the reference axis AX. However, there is a case where the optical axis of the objective lens 10 shifts from the reference axis AX when the objective lens 10 is moved by a tracking mechanism (not shown) in a radial direction of the optical disc being used.

In FIG. 1, a solid line represents a laser beam L1 used for the optical disc D1, and a dotted line represents a laser beam L2 used for the optical disc D2. That is, the solid line represents an incident laser beam proceeding toward the optical disc D1 and a returning light beam from the optical disc D1, and the dotted line represents an incident laser beam proceeding toward the optical disc D2 and a returning light beam from the optical disc D2.

Each of the BD module 21 and the DVD module 22 is a device having a semiconductor laser and a photoreceptor integrally provided on the device. The BD laser module 21 has the semiconductor laser which emits the laser beam L1 having the wavelength $\lambda 1$, and the DVD module 22 has the semiconductor laser which emits the laser beam L2 having the wavelength $\lambda 2$.

When the optical disc D1 is used, the BD module 21 is activated. The laser beam L1 emitted by the semiconductor laser of the BD module 21 is incident on the collimator lens 24 via the beam combiner 23. The collimator lens 24 converts the incident laser beam L1 into a collimated beam. The laser beam L1 emerging from the collimator lens 24 is then incident on the objective lens 10. The objective lens 10 converges the incident laser beam L1 in the vicinity of the recording surface of the optical disc D1. The converged laser beam L1 forms a beam spot on the recording surface of the optical disc D1. The laser beam L1 reflecting from the recording surface of the optical disc D1 returns along the same optical path along which the laser beam proceeds toward the optical disc D1, and then is received by the photoreceptor of the BD module 21.

When the optical disc D2 is used, the DVD module 22 is activated. The laser beam L2 emitted by the semiconductor laser of the DVD module 22 is incident on the collimator lens 24 via the beam combiner 23. The collimator lens 24 converts the incident laser beam L2 into a collimated beam. The laser beam L2 emerging from the collimator lens 24 is then incident on the objective lens 10. The objective lens 10 converges the incident laser beam L1 in the vicinity of the recording surface of the optical disc D2. The converged laser beam L2 forms a beam spot on the recording surface of the optical disc D2. The laser beam reflecting from the recording surface of the optical disc D2 returns along the same optical path along which the laser beam proceeds toward the optical disc D2, and then is received by the photoreceptor of the DVD module 22.

Each of the photoreceptors provided on the BD and DVD modules 21 and 22 detects the returning light beam, and outputs a signal to a signal processing circuit 30. The signal processing circuit 30 detects a focus error signal, a tracking error signal and a reproduction signal recorded on the optical disc being used based on an output from one of the photoreceptors. As described above, for each of the optical discs D1 and D2, a collimated laser beam is incident on the objective lens 10. Therefore, even when the objective lens 10 moves, by a minute amount, in a direction orthogonal to the optical axis of the objective lens 10 by a tracking operation, off-axis aberrations, such as a coma, are not caused.

Incidentally, the amount of spherical aberration caused in the optical information recording/reproducing apparatus 100 changes between the situation where the optical disc D1 is used and the situation where the optical disc D2 is used due to the difference in protective layer thickness between the optical disc D1 and the optical disc D2. For example, when the optical information recording/reproducing apparatus 100 is designed to be optimized for the optical disc D1, the spherical aberration becomes an overcorrected condition when the optical disc D2 is used due to the difference in protective layer thickness between the optical discs D1 and D2. Therefore, such a configuration is not appropriate for use of the optical disc D2. On the other hand, when the optical information recording/reproducing apparatus 100 is designed to be optimized for the optical disc D2, the spherical aberration becomes an undercorrected condition due to the difference in protective layer thickness between the optical discs D1 and D2. Therefore, such a configuration is not appropriate for use of the optical disc D2.

In order to achieve the compatibility with the optical discs D1 and D2 (i.e., to guarantee the information recording and information reproducing for the optical discs D1 and D2 based on the different standards), it is required to suitably correct the spherical aberration for each of the optical discs D1 and D2. It is also required to form a beam spot having the size complying with the recording density (i.e., a pit size) for each of the optical discs D1 and D2, and thereby to enhance the S/N ratio of signals (e.g., the reproduction signal). In order to meet the above described requirements, according to the embodiment, the objective lens 10 is configured as follows.

FIG. 2A is a front view of the objective lens 10, and FIG. 2B is a side cross section of the objective lens 10. As described above, the objective lens 10 is mounted on the optical information recording/reproducing apparatus 100 having the compatibility with a plurality of types of optical discs (i.e., the optical discs D1 and D2) based on the different standards, and has the function of converging the laser beams emitted from the semiconductor lasers (light sources) onto the recording surfaces of the optical discs D1 and D2, respectively.

The objective lens 10 is a biconvex single element lens made of resin, and has a first surface 10a facing the collimator lens 24 and a second surface 10b facing the optical disc. Each of the first and second surfaces 10a and 10b of the objective lens 10 is an aspherical surface. A shape of an aspherical surface is expressed by a following equation:

$$SAG = \frac{\frac{h^2}{r}}{1+\sqrt{1-(1+\kappa)\left(\frac{h}{r}\right)^2}} + A_4 h^4 + A_6 h^6 + A_8 h^8 + \ldots$$

where, SAG (a sag amount) is a distance between a point on the aspherical surface at a height of h (unit: mm) from the optical axis and a plane tangential to the aspherical surface at the optical axis, r is a curvature radius (unit: mm) of the aspherical surface on the optical axis (i.e., 1/r represents a curvature of the aspherical surface on the optical axis), $\kappa$ is a conical coefficient, and $A_4, A_6, \ldots$ represent aspherical coefficients larger than or equal to the fourth order. By forming each of the surfaces of the objective lens 10 to be an aspherical surface, it becomes possible to appropriately control the various aberrations, such as a spherical aberration and a coma.

As shown FIG. 2A, the first surface 10a of the objective lens 10 has a circular first region RC having the center corresponding to the position of the optical axis, and a second region RE which is located outside the first region RC and has a ring-shape. On the entire region including the first region RC and the second region RE on the first surface 10a, an annular zone structure is formed. As shown in a circled enlarged view in FIG. 2B, the annular zone structure has a plurality of annular zones (refractive surface zones) which are concentrically formed about the optical axis and are divided by minute steps each of which extends in a direction parallel with the optical axis. The total number of steps formed in the entire region including the first region RC and the second region RE is, for example, 20 or more. Of the regions RC and RE, the second region RE has one or more steps. The annular zone structure may be formed only on the second surface 10b or may be formed on both of the first and second surfaces 10a and 10b of the objective lens 10. It should be noted that in the circled enlarged view in FIG. 2B, each step is illustrated to have an ideal step shape not having a rounded corner which is described later.

By providing the annular zone structure on the first surface 10a (not on the second surface 10b), the following advantages can be achieved. That is, it becomes possible to increase the minimum annular zone width of the annular zone structure, and thereby it becomes possible to suppress loss of the light amount caused at step portions of the annular zones with respect to the effective beam width. Furthermore, since the optical surface (first surface 10a) on which the annular zone structure is formed does not face the optical disc being rotated, the possibility that dust is adhered to the optical surface (i.e., the first surface 10a) on which the annular zone structure is formed can be suppressed. Furthermore, the possibility that the objective lens 10 is worn by brushing by a lens cleaner can be prevented.

Each step of the annular zone structure is formed to cause a predetermined optical path length difference between a light beam passing through the inside of a boundary between adjacent ones of the annular zones and a light beam passing through the outside of the boundary. In general, such an annular zone structure can be expressed as a diffraction structure. The annular zone structure formed such that the predetermined optical path length difference is n-times (n: integer) as large as a particular wavelength $\alpha$ can be expressed as an n-th order diffraction structure having the blazed wavelength of $\alpha$. A diffraction order of diffracted light at which the diffraction efficiency is maximized when a light beam having a particular wavelength $\lambda\beta$ passes through the diffraction structure can be obtained as an integer m which is closest to a value defined by dividing an optical path length difference given to the light beam having the wavelength $\lambda\beta$ by the wavelength $\lambda\beta$.

In addition, the fact that the optical path length difference is generated between a light beam passing through the inside of a boundary between adjacent ones of the annular (refractive) zones and a light beam passing through the outside of the boundary can be considered as a phenomenon that phases of the light beams are shifted with respect to each other by the effect of each step of the annular zone structure. Therefore, the annular zone structure can be expressed as a structure for shifting phases of incident light beams (i.e., a phase shift structure).

The annular zone structure can be expressed by an optical path difference function $\phi(h)$. The optical path difference function $\phi(h)$ is a function representing the functional capability of the objective lens 10 (a diffraction lens) in a form of an additional optical path length at the height h from the optical axis of the objective lens 10. The optical path difference function $\phi(h)$ can be expressed by a following equation:

$$\phi(h)=(P_2 \times h^2+P_4 \times h^4+P_6 \times h^6+P_8 \times h^8+P_{10} \times h^{10}+P_{12} \times h^{12})m\lambda$$

where $P_2, P_4, P_6 \ldots$ represent coefficients of the $2^{nd}$ order, $4^{th}$ order, $6^{th}$ order, h represents a height from the optical axis, m represents a diffraction order at which the diffraction efficiency of the incident laser beam is maximized, and $\lambda$ represents a design wavelength of the laser beam being used.

The annular zone structure formed in the first region RC is configured to contribute to converging each of the laser beams L1 and L2. Specifically, the annular zone structure in the first region RC is configured to converge the laser beam L1 onto the recording surface of the optical disc D1 and to converge the laser beam L2 onto the recording surface of the optical disc D2. When the annular zone structure provided in the first region RC is regarded as the diffraction structure, the annular zone structure provided in the first region RC is configured such that, for each of the laser beams L1 and L2, the diffraction order at which the diffraction efficiency is maximized is the first order.

By designing the first region RC to use the first order diffracted light for each of the laser beams L1 and L2, it becomes possible to achieve a balance between the diffraction efficiency for the laser beam L1 and the diffraction efficiency for the laser beam L2, and thereby it becomes possible to effectively avoid occurrence of a problem that one of the diffraction efficiencies for the laser beams L1 and L2 becomes too low. Furthermore, in this case, a required additional optical path length is small, the height of each step becomes small, and therefore processing of a metal mold and molding for the objective lens 10 can be eased.

The annular zone structure formed on the second region RE is configured to contribute to only converging the laser beam L1. Specifically, the annular zone structure in the second region RE is configured to converge the laser beam L1 onto the recording surface of the optical disc D1, and not to converge the laser beam L2 onto the recording surface of the optical disc D2. In other words, the second region RE can be defined as a region having the function as an aperture stop for the laser beam L2. The annular zone structure formed on the second region RE is designed exclusively for the optical disc D1, and is designed such that the diffraction efficiency is approximately 100% for the laser beam L1.

Since the second region RE is a dedicated region for the optical disc D1, the diffraction efficiency for the laser beam L1 in the second region RE is higher than the diffraction efficiency for the laser beam L1 in the first region RC. In this case, regarding the laser beam L1, the transmission light amount (i.e., the amount of light transmitted through the objective lens 10) may have unevenness between the pupil center and the peripheral of the pupil. As a result, a possibility arises that the beam spot size is reduced excessively on the recording surface of the optical disc D1 due to super-resolution. For this reason, in this embodiment, the effect on the spot shape by the super-resolution is eased by considering a balance between the transmissivity reflecting loss of light amount by a rounded corner caused on each step in the second region RE and the diffraction efficiency of the first region RC.

FIG. 3 is an explanatory illustration for explaining rounded corners. In FIG. 3, a hatched portion represents the shape of a step structure where rounded corners are caused, and a dashed line represents an ideal shape of each step where no rounded corner is caused. In FIG. 3, a rounded corner having a width $\Delta h$ (=h2−(the step position h1)) which is the same as the step height D is caused at each step.

Since the shape of a step structure formed in a metal mold is a fine structure, there is a case where, in an injection molding process, resin can not be injected into a deep part of each step portion. Each rounded corner illustrated as an example in FIG. 3 is a shape error caused principally due to the fact that the shape of the metal mold is transferred to the objective lens in a state where resin at each corner is rounded by shortage of injection of resin into each step portion. The rounded corner of each step causes the loss of light amount. Therefore, occurrence of such a rounded corner is unfavorable.

The loss of light amount caused by a rounded corner at each step changes depending on the size of the rounded corner with respect to the size of the step. In qualitative consideration, as the size of the rounded corner with respect to the size of the step increases, the loss of light amount increases. Furthermore, the size of the rounded corner becomes larger as the design size of each step in the optical axis direction increases. The loss of light amount by the rounded corners depends on a projected area of the rounded corners on a plane orthogonal to the optical axis. Therefore, the effect by the rounded corners at the steps formed on the first region RC is larger than the effect by the rounded corners at the steps formed on the second region RE which has a large projected area than that of the first region RC. Furthermore, regarding the second region RE, the transmission light amount is proportional to the second power of the ratio of the projected area, which is not affected by the rounded corners in the second region RE, with respect to the projected area of the second region RE.

The objective lens 10 is configured to achieve a balance between the transmission light amount of the laser beam L1 in the second region RE (hereafter, referred to as "peripheral part transmission light amount") and the transmission light amount of the laser beam L1 in the first region RC (hereafter, referred to as "central part transmission light amount"), and to reduce the effect on the spot shape by the super-resolution. Specifically, when rein represents the diffraction efficiency in the first region RC within the effective beam diameter of the first surface 10$a$ having the annular zone structure, Sout represents a projected area of the second region RE on a plane orthogonal to the optical axis, and Sd represents a projected area of the rounded corners in the second region RE defined assuming that a rounded corner having a width equal to the height of a step in the optical axis direction is caused at each step, the following condition (1) is satisfied.

$$0.80 < ((Sout - Sd)/Sout)^2 / \eta in < 1.45 \quad (1).$$

In other words, Sout represents the projected area of the second region RE which is projected in the optical axis direction on the plane orthogonal to the optical axis, and is the area of the second area RE as illustrated in FIG. 2A. Sd, which is defined in Sout, represents a projected area of a portion where the loss of light amount is caused by the rounded corners formed at the steps in the second region RE. For example, in FIG. 3, Sd corresponds to an area occupied by the rounded corners each having the width $\Delta h$. The area occupied by the rounded corners is defined by the following equation.

$$\pi \times \{(h2)^2 - (h1)^2\} \approx \pi \times \{(h1+D)^2 - (h1)^2\}$$

The condition (1) defines a ratio between the transmission light amount of the first region RC and the transmission light amount of the second region RE. When the condition (1) is satisfied, the transmission light amount of the second region RE becomes approximately equal to the diffraction efficiency of the first region RC. That is, by satisfying the condition (1), a balance between the peripheral part transmission light amount and the central part transmission light amount can be achieved, and the effect on the spot shape by the super-resolution can be suppressed.

When the intermediate term of the condition (1) gets larger than the upper limit of the condition (1), the transmission light amount in the second region RE becomes larger than the diffraction efficiency in the first region RC (i.e., the peripheral part transmission light amount is excessively large with respect to the central part transmission light amount). Therefore, it is impossible to avoid the effect by the super-resolution, and therefore the size of the beam spot on the recording surface of the optical disc D1 is reduced excessively. When the intermediate term of the condition (1) gets smaller than the lower limit of the condition (1), the loss of light amount in the second region RE becomes considerably large, and therefore the peripheral part transmission light amount becomes considerably small. That is, in this case, the second region RE functions as an aperture stop for the laser beam L1. Therefore, the numerical aperture NA is changed, and it becomes impossible to form a suitable beam spot on the recording surface of the optical disc D1.

The objective lens 10 according to the embodiment is configured to suitably correct the spherical aberration caused by the temperature change by forming steps in the second region RE. Such a configuration is more advantageous than the configuration disclosed in JP HEI 7-98431A where merely the amount of incident light in the peripheral part of the objective lens is reduced.

According to the embodiment, the objective lens 10 is able to independently suppress the effect on the spot shape by the super-resolution. Such a configuration is advantageous in regard to downsizing of the optical information recording/reproducing apparatus 100.

Figure 4A:
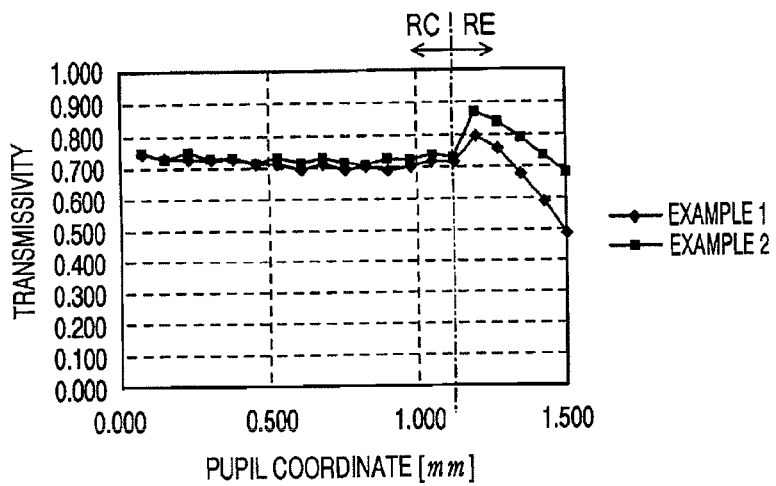
FIGS. 4A, 4B and 4C are explanatory illustrations for explaining change of a beam spot size with respect to a value of a condition (1).
Figure 4B:
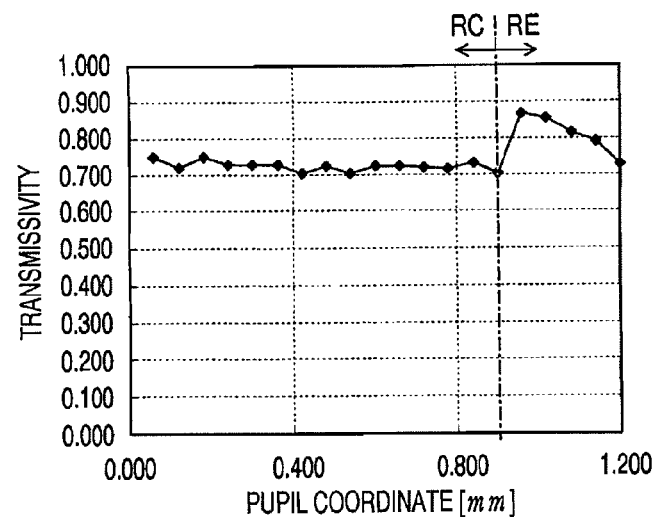
Figure 4C:
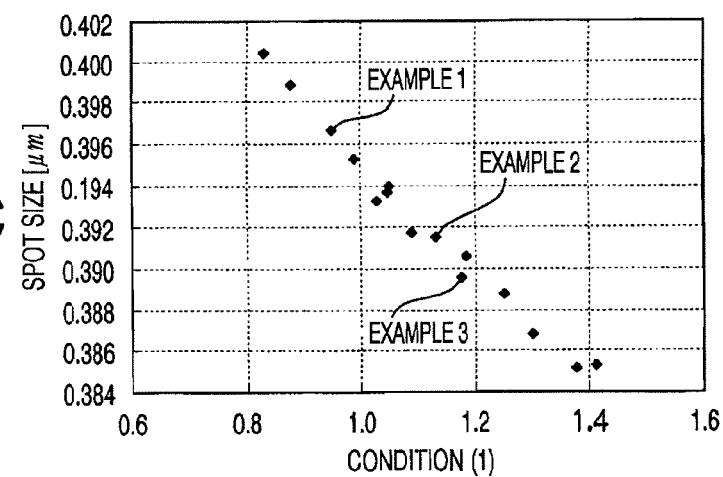

FIGS. 4A, 4B and 4C are graphs for illustrating change of the spot size with respect to the value of the condition (1). In each of FIGS. 4A and 4B, the vertical axis represents the transmissivity (no unit is defined for the transmissivity because of normalization), and the horizontal axis represents the pupil coordinate (unit: mm). In FIG. 4C, the vertical axis represents the size (unit: μm) of the beam spot formed on the recording surface of the optical disc D1, and the horizontal axis represents the value of the condition (1). It should be noted that the spot size takes an ideal value when the balance is achieved between the peripheral part transmission light amount and the central part transmission light amount. In FIG. 4C, as the value of the condition (1) becomes closer to 1, the spot size becomes closer to an ideal value. Hereafter, three examples (Examples 1, 2 and 3) satisfying the condition (1) are explained.

In Example 1, the ratio of the total number of steps in the second region RE with respect to the total number of steps in the effective beam diameter is relatively large, and the transmissivity in the second region RE is relatively small as shown in FIG. 4A. In Example 2, the ratio of the total number of steps in the second area RE with respect to the total number of steps in the effective beam diameter is smaller than that of the Example 1, and the transmissivity in the second area RE is larger than that of the Example 1 as shown in FIG. 4A. In Example 3, the ratio of the total number of steps in the second area RE with respect to the total number of steps in the effective beam diameter is smaller than that of the Example 2, and the transmissivity in the second area RE is larger than that of the Example 2 as shown in FIG. 4B. Since the ratio of the peripheral part transmission light amount with respect to the central part transmission light amount in the Example 2 is larger than that in the Example 1, the Example 2 is affected by the super-resolution more strongly than the Example 1. Since the ratio of the peripheral part transmission light amount with respect to the central part transmission light amount in the Example 3 is larger than that in the Example 2, the Example 3 is affected by the super-resolution more strongly than the Example 2. Therefore, as shown in FIG. 4C, the spot sizes of the Examples 1, 2 and 3 decreases in this order. In examples shown in FIGS. 4A, 4B and 4C, the spot size becomes smaller as the value of the condition (1) increases. However, as long as the condition (1) is satisfied, the spot size is not reduced excessively, and has a value close to an ideal value.

In FIG. 4C, fifteen examples are shown. Each of the fifteen examples satisfies the condition (1), and the spot sizes of the fifteen examples fall within the range of 0.384 to 0.401. The spot size of each example in FIG. 4C falls within the range of approximately +1.5% to −3.0% of the ideal spot size (i.e., the spot size approximately 0.395 μm defined when the value of the condition (1) is 1). Therefore, suitable information recording and information reproducing for the optical disc D1 can be achieved. It should be noted that the degree of bad effect, such as jitter, caused when the spot size is larger than the ideal spot size is greater than the degree of bad effect caused when the spot size is smaller than the ideal spot size. For this reason, the condition (1) is defined so that an acceptable spot size difference between the size of the actual beam spot and the size of the ideal beam spot becomes more strict (more small) for the case where the actual beam spot size is larger than the ideal beam spot, in comparison with the case where the actual beam spot is smaller than the ideal beam spot.

The condition (1) may be rewritten to the following condition (2):

$$0.80 < \eta out/\eta in < 1.45 \qquad (2)$$

where ηout represents the use efficiency of light of the second region RE including the effect by the rounded corners in the second region RE. Specifically, ηout represents a value defined by considering the diffraction efficiency and loss of light amount caused by the rounded corners, and is a ratio of the transmissivity defined when the second region RE has the step structure with respect to the transmissivity defined when the second region RE does not have the step structure.

By appropriately setting the blazed wavelength λB1 (unit: nm) in the first region RC, it becomes possible not only to optimize the spot shape, but also to achieve a balance between the transmission light amounts of the respective optical discs D1 and D2. The following Table 1 shows the relationship between the blazed wavelength λB1 and each of the diffraction efficiency of the laser beam L1 in the first region RC (shown as "BD" in Table 1) and the diffraction efficiency of the laser beam L2 in the first region RC (shown as "DVD" in Table 1). As shown in Table 1, the diffraction efficiency of the laser beam L1 becomes larger, as the blazed wavelength λB1 approaches to the wavelength λ1. On the other hand, the diffraction efficiency of the laser beam L1 becomes smaller, as the blazed wavelength λB1 approaches the wavelength λ2. Therefore, in this case, the central part transmission light amount decreases.

TABLE 1

|  |  | Blazed Wavelength λB1 [nm] | | | | |
| --- | --- | --- | --- | --- | --- | --- |
|  |  | 390 | 410 | 430 | 450 | 470 |
| Efficiency(%) | BD | 99.5% | 99.9% | 98.2% | 94.7% | 89.4% |
|  | DVD | 52.0% | 57.6% | 63.1% | 68.5% | 73.6% |

|  |  | Blazed Wavelength λB1 [nm] | | | |
| --- | --- | --- | --- | --- | --- |
|  |  | 490 | 510 | 530 | 550 |
| Efficiency(%) | BD | 82.8% | 74.9% | 66.3% | 57.2% |
|  | DVD | 78.4% | 82.9% | 87.0% | 90.6% |

In order to achieve a balance between the peripheral part transmission light amount and the central part transmission light amount and thereby to ease the effect on the spot shape by the super-resolution, it is desirable to increase the central part transmission light amount to approach the peripheral part transmission light amount. However, if the central part transmission light amount is increased excessively, a problem arises that the diffraction efficiency of the laser beam L2 in the first region RC decreases. For this reason, the blazed wavelength λB1 is set to satisfy the following condition (3).

$$450 \leq \lambda B1 \leq 530 \qquad (3).$$

By satisfying the condition (3), it becomes possible to secure the diffraction efficiency of 65% or more for each of the laser beams L1 and L2 (see Table 1). When λB1 gets smaller than the lower limit of the condition (3), the diffraction efficiency of the laser beam L2 in the first region RC becomes too low, and therefore it becomes impossible to suitably execute the information recording and information reproducing for the optical disc D2. When λB1 gets larger than the upper limit of the condition (3), the diffraction efficiency of the laser beam L1 in the first region RC becomes too low, and therefore in becomes impossible to suitably execute the information recording and information reproducing for the optical disc D1.

When λB2 (unit: nm) represents the blazed wavelength in the second region RE, the objective lens 10 is configured to satisfy the following condition (4).

$$390 \leq \lambda B2 \leq 420 \quad (4).$$

The following Table 2 shows the relationship between the blazed wavelength λB2 and the diffraction efficiency of the laser beam L1 in the second region RE. When λB2 gets larger than the upper limit of the condition (4) or when λB2 gets smaller than the lower limit of the condition (4), the diffraction efficiency decreases, which is unfavorable. However, as can be seen from Table 2, decrease of the diffraction efficiency is small when m (diffraction order) is 1 (m=1). It should be noted that Table 2 shows change of diffraction efficiency with respect to shift of the use wavelength. Therefore, the diffraction order of 1 (m=1) is preferable.

TABLE 2

|  |  | Blazed Wavelength λB2[nm] | | | |
|---|---|---|---|---|---|
|  |  | 390 | 400 | 410 | 420 |
| Efficiency (%) | m = 1 | 99.5% | 99.8% | 99.9% | 99.6% |
| BD | m = 2 | 97.4% | 99.6% | 99.8% | 98.1% |
|  | m = 3 | 94.3% | 99.2% | 99.6% | 95.7% |
|  | m = 4 | 90.0% | 98.6% | 99.4% | 92.4% |

By satisfying the condition (4), the diffraction efficiency of the laser beam L1 in the second region RE which is the dedicated region for the optical disc D1 becomes 100%. If λB2 falls outside the range of the condition (4), the diffraction efficiency of the laser beam L1 decreases remarkably. In this case, in order to maintain the balance between the peripheral part transmission light amount and the central part transmission light amount, it is necessary to decrease the central part transmission light amount in accordance with decrease of the peripheral part transmission light amount. However, if the central part transmission light amount is decreased in addition to decrease of the peripheral part transmission light amount, the light amount for the information recording and information reproducing for the optical disc D1 falls short, which is undesirable.

When NA1' represents the numerical aperture for the laser beam L1, and NA2' represents the numerical aperture for the laser beam L2, the objective lens 10 is configured to satisfy the following conditions (5) and (6).

$$0.78 < NA1' < 0.90 \quad (5);$$

$$0.58 < NA2' < 0.68 \quad (6)$$

That is, NA1' and NA2' of the objective lens 10 are appropriate values for the information recording and the information reproducing for the optical discs D1 and D2, respectively.

In order to further suppress the effect on the spot shape by the super-resolution, the objective lens 10 may be configured to satisfy the following condition (7).

$$0.85 < ((Sout - Sd)/Sout)^2 / \eta in < 1.15 \quad (7)$$

The condition (7) may be rewritten into the following condition (8).

$$0.85 < \eta out / \eta in < 1.15 \quad (8)$$

Hereafter, fifteen concrete examples (first to fifteenth examples) of the optical information recording/reproducing apparatus 100 on which the objective lens 10 is mounted are explained. Each of the optical information recording/reproducing apparatuses 100 according to the first to fifteenth examples has the general configuration shown in FIG. 1. The objective lens 10 according to each of the first to fifteenth examples has the configuration shown in FIGS. 2A and 2B. Let us consider that, in each of the first to fifteenth examples, the rounded corner shown in FIG. 3 is caused at each step on the first surface 10a of the objective lens 10. The first to fifteenth examples explained below respectively correspond to the fifteen examples shown in FIG. 4C. Since the differences in shape of the objective lens 10 between the first to fifteenth examples are extremely small and cannot be expressed by the drawings, the configuration of the optical information recording/reproducing apparatus 100 shown in FIG. 1 is used as a representative configuration for explanation of each of the first to fifteenth examples.

FIRST EXAMPLE

Hereafter, a first example of the optical information recording/reproducing apparatus 100 is described. The specifications of the objective lens 10 mounted on the optical information recording/reproducing apparatus 100 according to the first example are indicated in the following Table 3. Specifically, Table 3 shows the use wavelength, the focal length, NA and the magnification of the objective lens 10. Various definitions regarding Tables in the first example are also applied to Tables in the other examples.

TABLE 3

| Wavelength (nm) | 406 | 662 |
|---|---|---|
| Focal Length (mm) | 1.77 | 1.86 |
| NA | 0.85 | 0.60 |
| Magnification | 0.000 | 0.000 |

As shown by the magnification in Table 3, in the optical information recording/reproducing apparatus 100, each of the laser beams used for the respective optical discs D1 and D2 is incident on the objective lens 10 as a collimated beam. Therefore, it is possible to prevent the off-axis aberrations from occurring when the objective lens 10 is shifted for a tracking operation.

The following Table 4 shows the numeral configuration of the optical information recording/reproducing apparatus 100 defined when each of the optical discs D1 and D2 is used.

TABLE 4

| Surface No. | r | d(406 nm) | n(406 nm) | d(660 nm) | n(660 nm) |  |
|---|---|---|---|---|---|---|
| 1-1 | 1.114 | 2.10 | 1.55903 | 2.10 | 1.53927 | Objective Lens |
| 1-2 | 1.105 |  |  |  |  | 10 |
| 2 | -2.226 | 0.58 |  | 0.36 |  |  |
| 3 | ∞ | 0.0875 | 1.62096 | 0.6000 | 1.57838 | Optical Disc |
| 4 | ∞ | — |  | — |  |  |

In Table 4, surface #1-1 represents the first region RC on the first surface 10a of the objective lens 10, surface #1-2 represents the second region RE on the first surface 10a of the objective lens 10, surface #2 represents the second surface 10b of the objective lens 10, surface #3 represents the protective layer surface of the optical disc to be used, and surface #4 represents the recording surface of the optical disc being used. In Table 4, "r" denotes the curvature radius (unit: mm) of each optical surface, "d(406 nm)" denotes the thickness of an optical component or the distance (unit: mm) from each optical surface to the next optical surface defined when the optical disc D1 is used, "n (406 nm)" represents the refractive index at the wavelength λ1, "d(660 nm)" denotes the thickness of an optical component or the distance (unit: mm) from each optical surface to the next optical surface defined when the optical disc D2 is used, "n (660 nm)" represents the refractive index at the wavelength λ2. For an aspherical surface, "r" represents the curvature radius on the optical axis.

Each of the first region RC (surface #1-1), the second region RE (surface #1-2) and the second surface 10b of the objective lens 10 is an aspherical surface. Each of the aspherical surfaces is optimally designed for the information recording and information reproducing for each of the optical discs D1 and D2. The following Table 5 shows the conical coefficients κ and aspherical coefficients $A_4, A_6 \ldots$ of each aspherical surface. In Table 5, the notation "E" means the power of 10 with an exponent specified by the number to the right of E (e.g. "E-04" means "$\times 10^{-4}$").

TABLE 5

| | Surface No. | | |
|---|---|---|---|
| | 1-1 | 1-2 | 2 |
| κ | −1.40000E+00 | −1.40000E+00 | −5.13000E+01 |
| $4^{th}$ order | 7.54500E−02 | 7.67700E−02 | 1.48800E−01 |
| $6^{th}$ order | 4.47700E−04 | −5.24800E−03 | −1.41700E−01 |
| $8^{th}$ order | 5.96400E−03 | 8.34900E−03 | 4.64200E−02 |
| $10^{th}$ order | −4.35700E−03 | −8.01170E−03 | 1.31750E−03 |
| $12^{th}$ order | 2.86500E−03 | 5.17360E−03 | −4.79830E−03 |
| $14^{th}$ order | −6.77200E−04 | −6.15100E−04 | −1.17830E−03 |
| $16^{th}$ order | 0.00000E+00 | −7.12000E−05 | 1.04770E−03 |
| $18^{th}$ order | 0.00000E+00 | 1.05300E−04 | 4.40900E−04 |
| $20^{th}$ order | 0.00000E+00 | 1.47140E−04 | −4.49800E−04 |
| 22th order | 0.00000E+00 | −4.71750E−05 | 1.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

On the first region RC (surface #1-1) and the second region RE (surface #1-2), the annular zone structure is formed. The following Table 6 shows the coefficients of the optical path difference function φ(h) defining the annular zone structure.

TABLE 6

| | Surface No. | |
|---|---|---|
| Diffraction Order | 1-1<br>1/1 | 1-2<br>1 |
| $2^{nd}$ | 3.29600E+01 | 3.80000E+01 |
| $4^{th}$ | −8.80000E+00 | −9.00000E+00 |
| $6^{th}$ | 1.03000E+00 | −5.50000E+00 |
| $8^{th}$ | −9.39000E−01 | −5.00000E−01 |
| $10^{th}$ | −2.88200E−01 | 0.00000E+00 |
| $12^{th}$ | 0.00000E+00 | 0.00000E+00 |

In Table 6, the diffraction order "1/1" means that both of the diffraction order at which the diffraction efficiency is maximized for the laser beam L1 in the first region RC and the diffraction order at which the diffraction efficiency is maximized for the laser beam L2 in the first region RC are the first orders. The diffraction order "1" means that the diffraction order at which the diffraction efficiency is maximized for the laser beam L1 in the second region RE is the first order.

The following Table 7 shows the concrete configuration of the annular zone structure formed in the first and second regions RC and RE. In Table 7, the annular zone numbers are assigned to the annular zones sequentially from the optical axis side. The steps at positions corresponding to the annular zone numbers 1 to 26 are formed in the first region RC, and the steps at positions corresponding to the annular zone numbers 27 to 83 are formed in the second region RE.

TABLE 7

(Positions of Steps)

| Number | Pupil Coordinate [mm] |
|---|---|
| 1 | 0.123 |
| 2 | 0.215 |
| 3 | 0.278 |
| 4 | 0.331 |
| 5 | 0.377 |
| 6 | 0.418 |
| 7 | 0.457 |
| 8 | 0.493 |
| 9 | 0.527 |
| 10 | 0.560 |
| 11 | 0.592 |
| 12 | 0.623 |
| 13 | 0.653 |
| 14 | 0.683 |
| 15 | 0.712 |
| 16 | 0.741 |
| 17 | 0.769 |
| 18 | 0.798 |
| 19 | 0.827 |
| 20 | 0.856 |
| 21 | 0.886 |
| 22 | 0.917 |
| 23 | 0.949 |
| 24 | 0.983 |
| 25 | 1.021 |
| 26 | 1.067 |
| Region Switch Position | 1.117 |
| 27 | 1.145 |
| 28 | 1.166 |
| 29 | 1.184 |
| 30 | 1.200 |
| 31 | 1.214 |
| 32 | 1.227 |
| 33 | 1.238 |
| 34 | 1.249 |
| 35 | 1.260 |
| 36 | 1.269 |
| 37 | 1.278 |
| 38 | 1.287 |
| 39 | 1.295 |
| 40 | 1.303 |
| 41 | 1.311 |
| 42 | 1.318 |
| 43 | 1.325 |
| 44 | 1.331 |
| 45 | 1.338 |
| 46 | 1.344 |
| 47 | 1.350 |
| 48 | 1.356 |
| 49 | 1.362 |
| 50 | 1.368 |
| 51 | 1.373 |
| 52 | 1.378 |
| 53 | 1.383 |
| 54 | 1.388 |
| 55 | 1.393 |
| 56 | 1.398 |
| 57 | 1.403 |
| 58 | 1.407 |

TABLE 7-continued (Positions of Steps)

| Number | Pupil Coordinate [mm] |
|---|---|
| 59 | 1.412 |
| 60 | 1.416 |
| 61 | 1.421 |
| 62 | 1.425 |
| 63 | 1.429 |
| 64 | 1.433 |
| 65 | 1.437 |
| 66 | 1.441 |
| 67 | 1.445 |
| 68 | 1.449 |
| 69 | 1.453 |
| 70 | 1.456 |
| 71 | 1.460 |
| 72 | 1.464 |
| 73 | 1.467 |
| 74 | 1.471 |
| 75 | 1.474 |
| 76 | 1.477 |
| 77 | 1.481 |
| 78 | 1.484 |
| 79 | 1.487 |
| 80 | 1.491 |
| 81 | 1.494 |
| 82 | 1.497 |
| 83 | 1.500 |
| Effective Radius | 1.500 |

SECOND EXAMPLE

Hereafter, a second example of the optical information recording/reproducing apparatus 100 is described. The specifications of the objective lens 10 mounted on the optical information recording/reproducing apparatus 100 according to the second example are indicated in the following Table 8.

TABLE 8

| Wavelength (nm) | 406 | 662 |
|---|---|---|
| Focal Length (mm) | 1.77 | 1.85 |
| NA | 0.85 | 0.60 |
| Magnification | 0.000 | 0.000 |

The following Table 9 shows the numeral configuration of the optical information recording/reproducing apparatus 100 defined when each of the optical discs D1 and D2 is used.

TABLE 9

| Surface No. | r | d(406 nm) | n(406 nm) | d(660 nm) | n(660 nm) | |
|---|---|---|---|---|---|---|
| 1-1 | 1.133 | 2.10 | 1.55903 | 2.10 | 1.53927 | Objective Lens |
| 1-2 | 1.129 | | | | | 10 |
| 2 | −2.196 | 0.59 | | 0.35 | | |
| 3 | ∞ | 0.0875 | 1.62096 | 0.6000 | 1.57838 | Optical Disc |
| 4 | ∞ | — | | — | | |

Each of the first region RC (surface #1-1), the second region RE (surface #1-2) and the second surface 10b of the objective lens 10 is an aspherical surface. Each of the aspherical surfaces is optimally designed for the information recording and information reproducing for each of the optical discs D1 and D2. The following Table 10 shows the conical coefficients $\kappa$ and aspherical coefficients $A_4$, $A_6$ ... of each aspherical surface.

TABLE 10

| | Surface No. | | |
|---|---|---|---|
| | 1-1 | 1-2 | 2 |
| $\kappa$ | −1.40000E+00 | −1.40000E+00 | −4.41000E+01 |
| $4^{th}$ order | 7.14100E−02 | 7.47000E−02 | 1.42500E−01 |
| $6^{th}$ order | 4.79200E−04 | −2.21300E−03 | −1.34840E−01 |
| $8^{th}$ order | 3.06500E−03 | 8.50260E−03 | 4.49160E−02 |
| $10^{th}$ order | −1.38200E−03 | −7.96400E−03 | 2.43900E−03 |
| $12^{th}$ order | 1.27200E−03 | 5.22500E−03 | −5.29150E−03 |
| $14^{th}$ order | −3.86500E−04 | −6.13570E−04 | −1.14300E−03 |
| $16^{th}$ order | 0.00000E+00 | −7.11220E−04 | 1.06040E−03 |
| $18^{th}$ order | 0.00000E+00 | 1.06600E−04 | 4.41580E−04 |
| $20^{th}$ order | 0.00000E+00 | 1.47410E−04 | −4.57070E−04 |
| $22^{th}$ order | 0.00000E+00 | −4.72490E−05 | 1.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

On the first region RC (surface #1-1) and the second region RE (surface #1-2), the annular zone structure is formed. The following Table 11 shows the coefficients of the optical path difference function $\phi(h)$ defining the annular zone structure.

TABLE 11

| | Surface No. | |
|---|---|---|
| Diffraction Order | 1-1 1/1 | 1-2 1 |
| $2^{nd}$ | 2.48450E+01 | 2.70000E+01 |
| $4^{th}$ | −8.34500E+00 | −5.00000E+00 |
| $6^{th}$ | −8.12000E−01 | −2.00000E+00 |
| $8^{th}$ | −1.64000E−01 | −3.00000E−01 |
| $10^{th}$ | −4.27700E−01 | 0.00000E+00 |
| $12^{th}$ | 0.00000E+00 | 0.00000E+00 |

The following Table 12 shows the concrete configuration of the annular zone structure formed in the first and second regions RC and RE. In Table 12, the steps at positions corresponding to the annular zone numbers 1 to 15 are formed in the first region RC, and the steps at positions corresponding to the annular zone numbers 16 to 32 are formed in the second region RE.

TABLE 12

(Positions of Steps)

| Number | Pupil Coordinate [mm] |
|---|---|
| 1 | 0.142 |
| 2 | 0.248 |
| 3 | 0.323 |
| 4 | 0.385 |
| 5 | 0.440 |
| 6 | 0.491 |
| 7 | 0.539 |
| 8 | 0.586 |
| 9 | 0.631 |
| 10 | 0.675 |
| 11 | 0.720 |
| 12 | 0.766 |
| 13 | 0.815 |
| 14 | 0.869 |
| 15 | 0.936 |
| Region Switch Position | 1.111 |
| 16 | 1.253 |
| 17 | 1.292 |
| 19 | 1.321 |
| 20 | 1.343 |
| 21 | 1.363 |
| 22 | 1.380 |
| 23 | 1.396 |
| 24 | 1.410 |
| 25 | 1.423 |
| 26 | 1.435 |
| 27 | 1.447 |
| 28 | 1.458 |
| 29 | 1.468 |
| 30 | 1.477 |
| 31 | 1.487 |
| 32 | 1.495 |
| Effective Radius | 1.500 |

THIRD EXAMPLE

Hereafter, a third example of the optical information recording/reproducing apparatus 100 is described. The specifications of the objective lens 10 mounted on the optical information recording/reproducing apparatus 100 according to the third example are indicated in the following Table 13.

TABLE 13

| Wavelength (nm) | 406 | 662 |
|---|---|---|
| Focal Length (mm) | 1.41 | 1.49 |
| NA | 0.85 | 0.60 |
| Magnification | 0.000 | 0.000 |

The following Table 14 shows the numeral configuration of the optical information recording/reproducing apparatus 100 defined when each of the optical discs D1 and D2 is used.

TABLE 14

| Surface No. | r | d(406 nm) | n(406 nm) | d(660 nm) | n(660 nm) | |
|---|---|---|---|---|---|---|
| 1-1 | 0.896 | 1.60 | 1.55903 | 1.60 | 1.53927 | Objective Lens |
| 1-2 | 0.902 | | | | | 10 |
| 2 | −1.933 | 0.50 | | 0.25 | | |
| 3 | ∞ | 0.0875 | 1.62096 | 0.6000 | 1.57838 | Optical Disc |
| 4 | ∞ | — | | — | | |

Each of the first region RC (surface #1-1), the second region RE (surface #1-2) and the second surface 10b of the objective lens 10 is an aspherical surface. Each of the aspherical surfaces is optimally designed for the information recording and information reproducing for each of the optical discs D1 and D2. The following Table 15 shows the conical coefficients $\kappa$ and aspherical coefficients $A_4$, $A_6$ . . . of each aspherical surface.

TABLE 15

| | Surface No. | | |
|---|---|---|---|
| | 1-1 | 1-2 | 2 |
| $\kappa$ | −8.50000E−01 | −8.50000E−01 | −4.10000E+01 |
| $4^{th}$ order | 4.55200E−02 | 5.04200E−02 | 2.36600E−01 |
| $6^{th}$ order | 1.02000E−02 | 1.95700E−02 | −2.75700E−01 |
| $8^{th}$ order | 1.96000E−02 | 7.27300E−04 | 7.17700E−02 |
| $10^{th}$ order | −2.39100E−02 | 4.54600E−03 | 4.68300E−02 |
| $12^{th}$ order | 2.50100E−02 | 1.64600E−02 | −1.09400E−02 |
| $14^{th}$ order | −1.01400E−02 | −1.35400E−02 | −2.14000E−02 |
| $16^{th}$ order | 0.00000E+00 | −4.05600E−03 | −6.09800E−03 |
| $18^{th}$ order | 0.00000E+00 | 5.38000E−03 | 1.55900E−02 |
| $20^{th}$ order | 0.00000E+00 | 3.82700E−03 | −5.48100E−03 |
| $22^{th}$ order | 0.00000E+00 | −3.38300E−03 | 7.00000E−04 |
| $24^{th}$ order | 0.00000E+00 | 0.00000E+00 | 0.00000E+00 |
| $26^{th}$ order | 0.00000E+00 | 0.00000E+00 | 0.00000E+00 |
| $28^{th}$ order | 0.00000E+00 | 0.00000E+00 | 0.00000E+00 |
| $30^{th}$ order | 0.00000E+00 | 0.00000E+00 | 0.00000E+00 |

On the first region RC (surface #1-1) and the second region RE (surface #1-2), the annular zone structure is formed. The following Table 16 shows the coefficients of the optical path difference function $\phi(h)$ defining the annular zone structure.

TABLE 16

| | Surface No. | |
|---|---|---|
| Diffraction Order | 1-1 1/1 | 1-2 1 |
| $2^{nd}$ | 3.51200E+01 | 3.00000E+01 |
| $4^{th}$ | −1.80000E+01 | −1.00000E+01 |
| $6^{th}$ | −6.28000E+00 | −3.00000E+00 |
| $8^{th}$ | −1.00000E−01 | −7.00000E−01 |
| $10^{th}$ | −3.84400E+00 | 0.00000E+00 |
| $12^{th}$ | 0.00000E+00 | 0.00000E+00 |

The following Table 17 shows the concrete configuration of the annular zone structure formed in the first and second regions RC and RE. In Table 17, the steps at positions corresponding to the annular zone numbers 1 to 14 are formed in the first region RC, and the steps at positions corresponding to the annular zone numbers 15 to 19 are formed in the second region RE.

TABLE 17

| | Pupil Coordinate [mm] |
|---|---|
| 1 | 0.120 |
| 2 | 0.209 |
| 3 | 0.272 |
| 4 | 0.325 |
| 5 | 0.372 |
| 6 | 0.416 |
| 7 | 0.457 |
| 8 | 0.498 |
| 9 | 0.538 |
| 10 | 0.579 |
| 11 | 0.622 |
| 12 | 0.670 |
| 13 | 0.732 |
| 14 | 0.874 |
| Region Switch Position | 0.891 |
| 15 | 1.072 |
| 16 | 1.112 |
| 17 | 1.140 |
| 18 | 1.163 |
| 19 | 1.183 |
| Effective Radius | 1.200 |

Hereafter, for each of the fourth to fifteenth examples and first and second comparative examples in addition to the first to third examples, the optical performance defined when the information recording or the information reproducing is executed for each of the optical discs D1 and D2 is validated. The objective lens 10 according to each of the fourth to seventh examples is configured such that positions of the steps are the same as those of the objective lens 10 according to the first example, and that only the blazed wavelength in the first region RC is different from the first example, and therefore the height D of the step of each of the fourth to seventh examples is different from the first example. The objective lens 10 according to each of the eighth to eleventh examples is configured such that positions of the steps are the same as those of the objective lens 10 according to the second example, and that only the blazed wavelength in the first region RC is different from the second example, and therefore the height D of the step of each of the eighth to eleventh examples is different from the second example. The objective lens 10 according to each of the twelfth to fifteenth examples is configured such that positions of the steps are the same as those of the objective lens 10 according to the third example, and that only the blazed wavelength in the first region RC is different from the third example, and therefore the height D of the step of each of the twelfth to fifteenth examples is different from the third example. The objective lens according to the first comparative example is configured such that the blazed wavelength $\lambda B1$ defining the annular zone structure is different from the first example, and the objective lens 10 according to the second comparative example is configured such that the blazed wavelength $\lambda B1$ defining the annular zone structure is different from the second example.

The following Table 18 shows, for each of the first to fifteenth examples and the first and second comparative examples, values of the conditions (1) to (8) and the size of the beam spot formed on the recording surface of the optical disc D1.

Figure 5A:
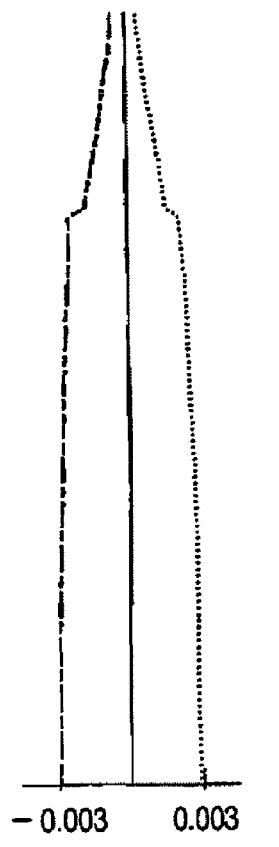
FIG. 5A is a graph illustrating the spherical aberration caused when an optical disc D1 is used in a first example.
Figure 5B:
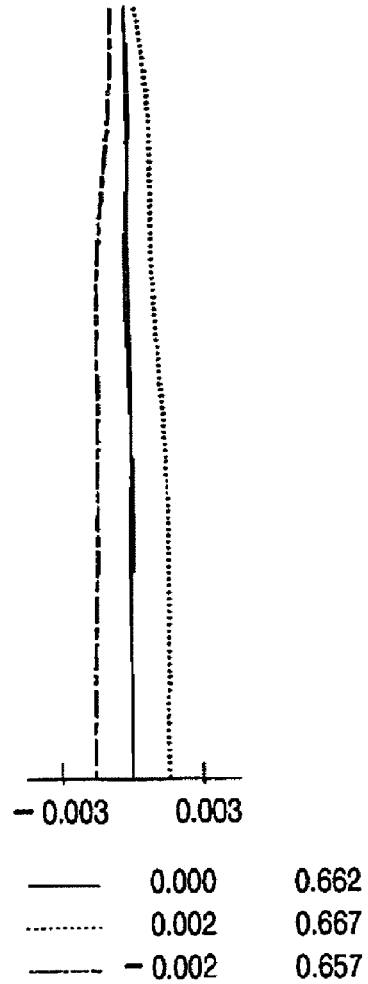
FIG. 5B is a graph illustrating the spherical aberration caused when an optical disc D2 is used in the first example.
Figure 6A:
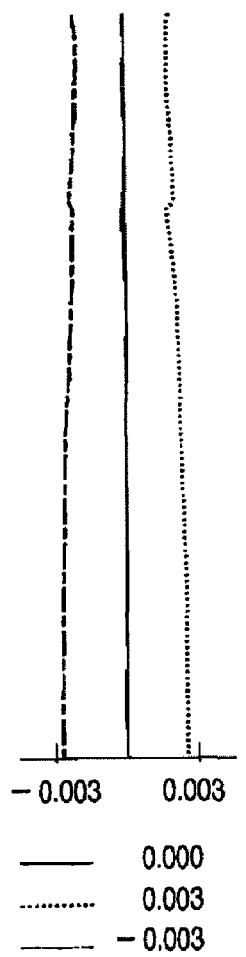
FIG. 6A is a graph illustrating the spherical aberration caused when the optical disc D1 is used in a second example.
Figure 6B:
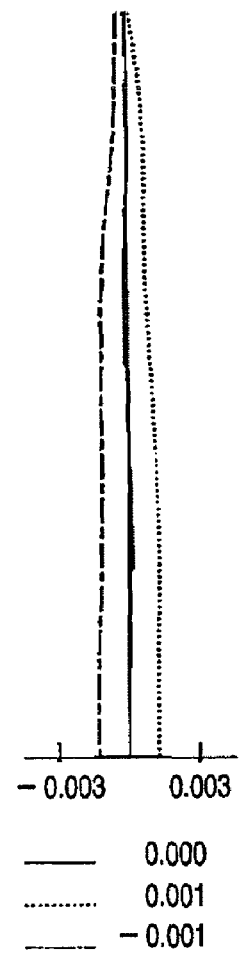
FIG. 6B is a graph illustrating the spherical aberration caused when the optical disc D2 is used in the second example.
Figure 7A:
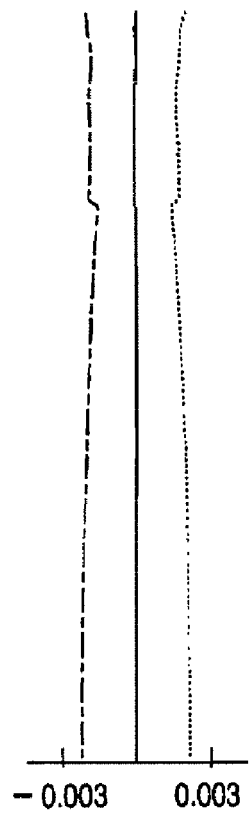
FIG. 7A is a graph illustrating the spherical aberration caused when the optical disc D1 is used in a third example.
Figure 7B:
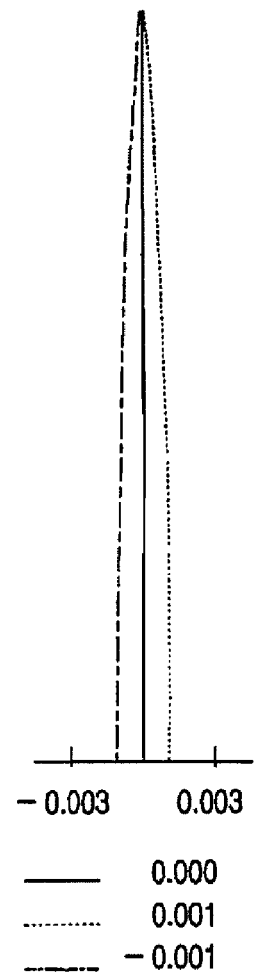
FIG. 7B is a graph illustrating the spherical aberration caused when the optical disc D2 is used in the third example.

FIG. 5A is a graph illustrating the spherical aberration caused when the optical disc D1 is used in the first example (or one of the fourth to seventh examples). FIG. 5B is a graph illustrating the spherical aberration caused when the optical disc D2 is used in the first example (or one of the fourth to seventh examples). FIG. 6A is a graph illustrating the spherical aberration caused when the optical disc D1 is used in the second example (or one of the eighth to eleventh examples). FIG. 6B is a graph illustrating the spherical aberration caused when the optical disc D2 is used in the second example (or one of the eighth to eleventh examples). FIG. 7A is a graph illustrating the spherical aberration caused when the optical disc D1 is used in the third example (or one of the twelfth to fifteenth examples). FIG. 7B is a graph illustrating the spherical aberration caused when the optical disc D2 is used in the third example (or one of the twelfth to fifteenth examples). In each of FIGS. 5A, 5B, 6A, 6B, 7A and 7B, the vertical axis represents the entrance pupil coordinate, and the horizontal axis represents the amount of spherical aberration (unit: $\lambda$rms). In FIGS. 5A, 6A and 7A, a curve indicated by a solid line, a curve indicated by a dotted line and a curve indicated by a chain line respectively represent the spherical aberration caused when the wavelength $\lambda 1$ of the laser beam L1 is 406 nm, the spherical aberration caused when the wavelength $\lambda 1$ of the laser beam L1 is 411 nm, and the spherical aberration caused when the wavelength $\lambda 1$ of the laser beam L1 is 401 nm. In FIGS. 5B, 6B and 7B, a curve indicated by a solid line, a curve indicated by a dotted line and a curve indicated by a chain line respectively represent the spherical aberration caused when the wavelength $\lambda 2$ of the laser beam L2 is 662 nm, the spherical aberration caused when the wavelength $\lambda 2$ of the laser beam L2 is 667 nm, and the spherical aberration caused when the wavelength $\lambda 2$ of the laser beam L2 is 657 nm.

TABLE 18

| | $1^{st}$ Example | $2^{nd}$ Example | $3^{rd}$ Example | $4^{th}$ Example | $5^{th}$ Example | $6^{th}$ Example |
|---|---|---|---|---|---|---|
| Condition (1) | 0.95 | 1.13 | 1.38 | 0.83 | 0.88 | 1.05 |
| Condition (2) | 0.95 | 1.13 | 1.38 | 0.83 | 0.88 | 1.05 |
| Condition (3) | 490 | 490 | 520 | 450 | 470 | 510 |
| Condition (4) | 405 | 405 | 405 | 405 | 405 | 405 |
| Condition (5) | 0.85 | 0.85 | 0.85 | 0.85 | 0.85 | 0.85 |
| Condition (6) | 0.60 | 0.60 | 0.60 | 0.60 | 0.60 | 0.60 |
| Condition (7) | 0.95 | 1.13 | 1.38 | 0.83 | 0.88 | 1.05 |
| Condition (8) | 0.95 | 1.13 | 1.38 | 0.83 | 0.88 | 1.05 |
| Spot Size | 0.397 | 0.392 | 0.385 | 0.400 | 0.399 | 0.394 |

| | $7^{th}$ Example | $8^{th}$ Example | $9^{th}$ Example | $10^{th}$ Example | $11^{th}$ Example | $12^{th}$ Example |
|---|---|---|---|---|---|---|
| Condition (1) | 1.19 | 0.99 | 1.05 | 1.25 | 1.41 | 1.30 |
| Condition (2) | 1.19 | 0.99 | 1.05 | 1.25 | 1.41 | 1.30 |
| Condition (3) | 530 | 450 | 470 | 510 | 530 | 510 |
| Condition (4) | 405 | 405 | 405 | 405 | 405 | 405 |

TABLE 18-continued

|  | | | | | |  |
|---|---|---|---|---|---|---|
| Condition (5) | 0.85 | 0.85 | 0.85 | 0.85 | 0.85 | 0.85 |
| Condition (6) | 0.60 | 0.60 | 0.60 | 0.60 | 0.60 | 0.60 |
| Condition (7) | 1.19 | 0.99 | 1.05 | 1.25 | 1.41 | 1.30 |
| Condition (8) | 1.19 | 0.99 | 1.05 | 1.25 | 1.41 | 1.30 |
| Spot Size | 0.391 | 0.395 | 0.394 | 0.389 | 0.385 | 0.387 |

|  | 13th Example | 14th Example | 15th Example | 1st Comparative Example | 2nd Comparative Example |
|---|---|---|---|---|---|
| Condition (1) | 1.18 | 1.09 | 1.03 | 0.79 | 1.52 |
| Condition (2) | 1.18 | 1.09 | 1.03 | | |
| Condition (3) | 490 | 470 | 450 | 425 | 540 |
| Condition (4) | 405 | 405 | 405 | 405 | 405 |
| Condition (5) | 0.85 | 0.85 | 0.85 | 0.85 | 0.85 |
| Condition (6) | 0.60 | 0.60 | 0.60 | 0.60 | 0.60 |
| Condition (7) | 1.18 | 1.09 | 1.03 | 0.79 | 1.52 |
| Condition (8) | 1.18 | 1.09 | 1.03 | | |
| Spot Size | 0.390 | 0.392 | 0.393 | 0.402 | 0.383 |

As shown in Table 18, in the first and second comparative examples, the condition (1) is not satisfied. Specifically, regarding the first comparative example, since the value of the intermediate term of the condition (1) is lower than the lower limit of the condition (1), the transmission light amount in the second region RE becomes extremely small, and therefore the second region RE functions substantially as an aperture stop for the laser beam L1. As a result, the numerical aperture NA is changed, and it becomes impossible to form a suitable beam spot on the recording surface of the optical disc D1. Regarding the second comparative example, since the value of the intermediate term of the condition (1) is larger than the upper limit of the condition (1), the transmission light amount of the second region RE becomes excessively large relative to the transmission light amount of the first region RC. In this case, it becomes impossible to avoid the effect of the super-resolution, and therefore the size of the beam spot on the recording surface of the optical disc D1 is reduced recessively. By contrast, as shown in Table 18, the condition (1) is satisfied for all of the first to fifteenth examples. Therefore, as shown in FIGS. 5A, 5B, 6A, 6B, 7A and 7B, in each of the first to fifteenth examples, a balance can be achieved between the peripheral part transmission light amount and the central part transmission light amount while suitably correcting the spherical aberration for each of the optical discs D1 and D2. As a result, as shown in Table 18 and FIG. 4B, it becomes possible to form a beam spot having substantially the same size as a spot size (e.g., 0.395 μm) formed by an ideal lens on the recording surface of the optical disc D1, and to suitably execute the information recording or information reproducing for each of the optical discs D1 and D2. It should be noted that in the first to fifteenth examples, the conditions (2) to (6) are also satisfied. In each of the examples 1, 2, 5, 6, 8, 9, 14 and 15, the conditions (7) and (8) are further satisfied. Therefore, the first to fifteenth examples are able to achieve further advantages by additionally satisfying the above described conditions.

In each of the first to fifteenth examples, the objective lens 10 is configured to strengthening the diffracting function while decreasing the peripheral part transmission light amount, by forming a number of steps in the second region RE. Therefore, the spherical aberration caused by the temperature change can be suitably corrected. Specifically, the changing amount of the spherical aberration due to the temperature change is suppressed to −0.011 λrms/50° C. in the first and fourth to eleventh examples, and the changing amount of the spherical aberration due to the temperature change is suppressed to −0.159 λrms/50° C. in the third and twelfth to fifteenth examples.

Although, in the first to fifteenth examples, it is assumed that the rounded corner Δh at each step is equal to the step height D, the advantages of the present invention can also be achieved by satisfying the conditions (1) and (2) even when the rounded corner Δh at each step varies depending on molding conditions. Furthermore, by satisfying the conditions (7) and (8), the advantages of the invention can be enhanced. It should be noted that, in a typical molding condition, the rounded corner Δh at each step may vary in a range from 0.3-fold value of the step height D to two-fold value of the step height D.

Although the present invention has been described in considerable detail with reference to certain preferred embodiments thereof, other embodiments are possible.

This application claims priority of Japanese Patent Applications No. P2009-289228, filed on Dec. 21, 2009 and No. P2010-178722, file on Aug. 9, 2010. The entire subject matter of the applications is incorporated herein by reference.

What is claimed is:

1. An objective lens for an optical information recording/reproducing apparatus configured to record information to and/or reproduce information from two types of optical discs including a first optical disc and a second optical disc differing in recording density, by selectively using substantially collimated light beams having first and second wavelengths, when λ1 (unit: nm) represents the first wavelength and λ2 (unit: nm) represents the second wavelength, λ1 and λ2 satisfying following relationships:

$$380 < \lambda 1 < 420; \text{ and}$$

$$640 < \lambda 2 < 700,$$

when t1 (unit: mm) represents a protective layer thickness of the first optical disc for which information recording or information reproducing is executed by using the light beam having the wavelength λ1, and t2 (unit: mm) represents a protective layer thickness of the second optical disc for which information recording or information reproducing is executed by using the light beam having the wavelength λ2, t1 and t2 satisfying following relationships:

$$0.05 < t1 < 0.15; \text{ and}$$

$$0.50 < t2 < 0.70,$$

when NA1 represents a numerical aperture required for the information recording or information reproducing for the first optical disc, and NA2 represents a numerical aperture required for the information recording or information reproducing for the second optical disc, NA1 and NA2 satisfying a following relationship:

NA1>NA2, the objective lens comprising, on at least one of surfaces of the objective lens:
a first region configured to converge the light beam having the first wavelength onto a recording surface of the first optical disc and to converge the light beam having the second wavelength onto a recording surface of the second optical disc; and
a second region that is located outside of the first region and is configured to converge the light beam having the first wavelength onto the recording surface of the first optical disc and not to converge the light beam having the second wavelength onto the recording surface of each of the first and second optical discs,
wherein:
the first region is divided into a plurality of refractive surface zones concentrically formed about an optical axis of the objective lens, and has a first step which is formed between adjacent ones of the plurality of refractive surface zones and gives an optical path length difference to an incident light beam;
a diffraction order at which a diffraction efficiency is maximized for each of the light beams having the first and second wavelengths passing through the first step in the first region is a first order;
the second region is divided into a plurality of refractive surface zones concentrically formed about the optical axis of the objective lens, and has a second step which is formed between adjacent ones of the plurality of refractive surface zones and gives an optical path length difference to an incident light beam; and
when ηin represents a diffraction efficiency in the first region, Sout represents a projected area of the second region on a plane which is orthogonal to the optical axis, and Sd represents a projected area of rounded corners each of which is formed at each step portion in the second region and has a width equal to an each step's height defined in a direction of the optical axis, the objective lens satisfies a condition:

$$0.80 < ((Sout-Sd)/Sout)^2/\eta in < 1.45 \qquad (1).$$

2. The objective lens according to claim 1,
wherein when λB1 (unit: nm) represents a blazed wavelength in the first region, λB1 satisfies a condition:

$$450 \leq \lambda B1 \leq 530 \qquad (3).$$

3. The objective lens according to claim 1,
wherein when λB2 (unit: nm) represents a blazed wavelength in the second region, λB2 satisfies a condition:

$$390 \leq \lambda B2 \leq 420 \qquad (4).$$

4. The objective lens according to claim 1,
wherein when NA1' represents a numerical aperture for the light beam having the wavelength λ1, and NA2' represents a numerical aperture for the light beam having the wavelength λ2, the objective lens satisfies following conditions:

$$0.78 < NA1' < 0.90 \qquad (5); \text{ and}$$

$$0.58 < NA2' < 0.68 \qquad (6).$$

5. The objective lens according to claim 1,
wherein the objective lens satisfies a condition:

$$0.85 < ((Sout-Sd)/Sout)^2/\eta in < 1.15 \qquad (7).$$

6. The objective lens according to claim 1, wherein a total number of steps in the first region and the second region is larger than or equal to 20.

7. The objective lens according to claim 1, wherein a number of steps in the second region is larger than or equal to 1.

8. The objective lens according to claim 1, wherein a diffraction order at which a diffraction efficiency of the light beam having the wavelength λ1 is maximized in the second region is a first order.

9. An optical information recording/reproducing apparatus configured to record information to and/or reproduce information from two types of optical discs including a first optical disc and a second optical disc differing in recording density by selectively using substantially collimated light beams having first and second wavelengths, comprising:
light sources emitting light beams having the first and second wavelength;
an objective lens; and
a signal processing unit which detects a returning light beam from a recording surface of one of the first and second optical discs and executes a predetermined signal processing,
when λ1 (unit: nm) represents the first wavelength and λ2 (unit: nm) represents the second wavelength, λ1 and λ2 satisfying following relationships:

$$380 < \lambda 1 < 420; \text{ and}$$

$$640 < \lambda 2 < 700,$$

when t1 (unit: mm) represents a protective layer thickness of the first optical disc for which information recording or information reproducing is executed by using the light beam having the wavelength λ1, and t2 (unit: mm) represents a protective layer thickness of the second optical disc for which information recording or information reproducing is executed by using the light beam having the wavelength λ2, t1 and t2 satisfying following relationships:

$$0.05 < t1 < 0.15; \text{ and}$$

$$0.50 < t2 < 0.70,$$

when NA1 represents a numerical aperture required for the information recording or information reproducing for the first optical disc, and NA2 represents a numerical aperture required for the information recording or information reproducing for the second optical disc, NA1 and NA2 satisfying a following relationship:

NA1>NA2, the objective lens comprising, on at least one of surfaces of the objective lens:
a first region configured to converge the light beam having the first wavelength onto a recording surface of the first optical disc and to converge the light beam having the second wavelength onto a recording surface of the second optical disc; and
a second region that is located outside of the first region and is configured to converge the light beam having the first wavelength onto the recording surface of the first optical disc and not to converge the light beam having the second wavelength onto the recording surface of each of the first and second optical discs, wherein:
the first region is divided into a plurality of refractive surface zones concentrically formed about an optical axis of the objective lens, and has a first step which is formed between adjacent ones of the plurality of refractive surface zones and gives an optical path length difference to an incident light beam;
a diffraction order at which a diffraction efficiency is maximized for each of the light beams having the first and second wavelengths passing through the first step in the first region is a first order;
the second region is divided into a plurality of refractive surface zones concentrically formed about the optical axis of the objective lens, and has a second step which is formed between adjacent ones of the plurality of refractive surface zones and gives an optical path length difference to an incident light beam;
when $\eta in$ represents a diffraction efficiency in the first region, Sout represents a projected area of the second region on a plane which is orthogonal to the optical axis, and Sd represents a projected area of rounded corners each of which is formed at each step portion in the second region and has a width equal to an each step's height defined in a direction of the optical axis, the objective lens satisfies a condition:

$$0.80 < ((Sout-Sd)/Sout)^2/\eta in < 1.45 \qquad (1).$$

10. An objective lens for an optical information recording/reproducing apparatus configured to record information to and/or reproduce information from two types of optical discs including a first optical disc and a second optical disc differing in recording density, by selectively using substantially collimated light beams having first and second wavelengths,
when $\lambda 1$ (unit: nm) represents the first wavelength and $\lambda 2$ (unit: nm) represents the second wavelength, $\lambda 1$ and $\lambda 2$ satisfying following relationships:

$$380 < \lambda 1 < 420; \text{ and}$$

$$640 < \lambda 2 < 700,$$

when t1 (unit: mm) represents a protective layer thickness of the first optical disc for which information recording or information reproducing is executed by using the light beam having the wavelength $\lambda 1$, and t2 (unit: mm) represents a protective layer thickness of the second optical disc for which information recording or information reproducing is executed by using the light beam having the wavelength $\lambda 2$, t1 and t2 satisfying following relationships:

$$0.05 < t1 < 0.15; \text{ and}$$

$$0.50 < t2 < 0.70,$$

when NA1 represents a numerical aperture required for the information recording or information reproducing for the first optical disc, and NA2 represents a numerical aperture required for the information recording or information reproducing for the second optical disc, NA1 and NA2 satisfying a following relationship:

$$NA1 > NA2,$$

the objective lens comprising, on at least one of surfaces of the objective lens:
a first region configured to converge the light beam having the first wavelength onto a recording surface of the first optical disc and to converge the light beam having the second wavelength onto a recording surface of the second optical disc; and
a second region that is located outside of the first region and is configured to converge the light beam having the first wavelength onto the recording surface of the first optical disc and not to converge the light beam having the second wavelength onto the recording surface of each of the first and second optical discs,
wherein:
the first region is divided into a plurality of refractive surface zones concentrically formed about an optical axis of the objective lens, and has a first step which is formed between adjacent ones of the plurality of refractive surface zones and gives an optical path length difference to an incident light beam;
a diffraction order at which a diffraction efficiency is maximized for each of the light beams having the first and second wavelengths passing through the first step in the first region is a first order;
the second region is divided into a plurality of refractive surface zones concentrically formed about the optical axis of the objective lens, and has a second step which is formed between adjacent ones of the plurality of refractive surface zones and gives an optical path length difference to an incident light beam; and
when $\eta in$ represents a diffraction efficiency in the first region, and $\eta out$ represents a light use efficiency of the second region including rounded corners, the objective lens satisfies a condition:

$$0.80 < \eta out/\eta in < 1.45 \qquad (2).$$

11. The objective lens according to claim 10,
wherein when $\lambda B1$ (unit: nm) represents a blazed wavelength in the first region, $\lambda B1$ satisfies a condition:

$$450 \leq \lambda B1 \leq 530 \qquad (3).$$

12. The objective lens according to claim 10,
wherein when $\lambda B2$ (unit: nm) represents a blazed wavelength in the second region, $\lambda B2$ satisfies a condition:

$$390 \leq \lambda B2 \leq 420 \qquad (4).$$

13. The objective lens according to claim 10,
wherein when NA1' represents a numerical aperture for the light beam having the wavelength $\lambda 1$, and NA2' represents a numerical aperture for the light beam having the wavelength $\lambda 2$, the objective lens satisfies following conditions:

$$0.78 < NA1' < 0.90 \qquad (5); \text{ and}$$

$$0.58 < NA2' < 0.68 \qquad (6).$$

14. The objective lens according to claim 10,
wherein the objective lens satisfies a condition:

$$0.85 < \eta out/\eta in < 1.15 \qquad (8).$$

15. The objective lens according to claim 10, wherein a total number of steps in the first region and the second region is larger than or equal to 20.

16. The objective lens according to claim 10, wherein a number of steps in the second region is larger than or equal to 1.

17. The objective lens according to claim 10, wherein a diffraction order at which a diffraction efficiency of the light beam having the wavelength $\lambda 1$ is maximized in the second region is a first order.

18. An optical information recording/reproducing apparatus configured to record information to and/or reproduce information from two types of optical discs including a first optical disc and a second optical disc differing in recording density by selectively using substantially collimated light beams having first and second wavelengths, comprising:

light sources emitting light beams having the first and second wavelength;

an objective lens; and a signal processing unit which detects a returning light beam from a recording surface of one of the first and second optical discs and executes a predetermined signal processing, when $\lambda1$ (unit: nm) represents the first wavelength and $\lambda2$ (unit: nm) represents the second wavelength, $\lambda1$ and $\lambda2$ satisfying following relationships:

$380<\lambda1<420$; and $640<\lambda2<700$, when t1 (unit: mm) represents a protective layer thickness of the first optical disc for which information recording or information reproducing is executed by using the light beam having the wavelength $\lambda1$, and t2 (unit: mm) represents a protective layer thickness of the second optical disc for which information recording or information reproducing is executed by using the light beam having the wavelength $\lambda2$, t1 and t2 satisfying following relationships:

$0.05<t1<0.15$; and $0.50<t2<0.70$, when NA1 represents a numerical aperture required for the information recording or information reproducing for the first optical disc, and NA2 represents a numerical aperture required for the information recording or information reproducing for the second optical disc, NA1 and NA2 satisfying a following relationship:

NA1>NA2, the objective lens comprising, on at least one of surfaces of the objective lens:

a first region configured to converge the light beam having the first wavelength onto a recording surface of the first optical disc and to converge the light beam having the second wavelength onto a recording surface of the second optical disc; and a second region that is located outside of the first region and is configured to converge the light beam having the first wavelength onto the recording surface of the first optical disc and not to converge the light beam having the second wavelength onto the recording surface of each of the first and second optical discs, wherein:

the first region is divided into a plurality of refractive surface zones concentrically formed about an optical axis of the objective lens, and has a first step which is formed between adjacent ones of the plurality of refractive surface zones and gives an optical path length difference to an incident light beam;

a diffraction order at which a diffraction efficiency is maximized for each of the light beams having the first and second wavelengths passing through the first step in the first region is a first order;

the second region is divided into a plurality of refractive surface zones concentrically formed about the optical axis of the objective lens, and has a second step which is formed between adjacent ones of the plurality of refractive surface zones and gives an optical path length difference to an incident light beam; and when $\eta$in represents a diffraction efficiency in the first region, and $\eta$out represents a light use efficiency of the second region including rounded corners, the objective lens satisfies a condition:

$0.80<\eta\text{out}/\eta\text{in}<1.45$ (2).

* * * * *